United States Patent
Onitsuka et al.

(10) Patent No.: US 11,217,059 B2
(45) Date of Patent: Jan. 4, 2022

(54) DECORATIVE ILLUMINATION DEVICE AND GAME MACHINE

(71) Applicant: OMRON Corporation, Kyoto (JP)

(72) Inventors: Hiroyuki Onitsuka, Kani (JP); Junya Fujita, Ichinomiya (JP); Takehiro Agata, Ichinomiya (JP)

(73) Assignee: OMRON Corporation, Kyoto (JP)

(*) Notice: Subject to any disclaimer, the term of this patent is extended or adjusted under 35 U.S.C. 154(b) by 0 days.

(21) Appl. No.: 17/174,748

(22) Filed: Feb. 12, 2021

(65) Prior Publication Data

US 2021/0279997 A1    Sep. 9, 2021

(30) Foreign Application Priority Data

Mar. 4, 2020  (JP) ............................ JP2020-037093

(51) Int. Cl.
*G07F 17/32* (2006.01)
*F21V 8/00* (2006.01)

(52) U.S. Cl.
CPC ........ *G07F 17/3211* (2013.01); *G02B 6/0055* (2013.01); *G02B 6/0068* (2013.01); *G02B 6/0075* (2013.01); *G02B 6/0088* (2013.01)

(58) Field of Classification Search
CPC .... G02B 6/0075; G07F 17/32; G07F 17/3202
See application file for complete search history.

(56) References Cited

U.S. PATENT DOCUMENTS

| | | | | |
|---|---|---|---|---|
| 6,769,798 B2* | 8/2004 | Mishimagi | ........... | B60Q 1/2665 362/522 |
| 9,910,210 B2* | 3/2018 | Niu | ...................... | G02B 6/0061 |
| 10,775,551 B2* | 9/2020 | Thompson | ............. | G02B 6/009 |
| 2010/0214802 A1* | 8/2010 | Masuda | ............... | G02B 6/0055 362/606 |
| 2010/0246200 A1* | 9/2010 | Tessnow | ............... | F21S 43/239 362/509 |
| 2011/0267563 A1* | 11/2011 | Shimizu | ................ | G02B 6/008 349/65 |
| 2014/0169017 A1* | 6/2014 | Song | ....................... | F21S 43/26 362/511 |
| 2014/0226361 A1* | 8/2014 | Vasylyev | ............. | G02B 6/0025 362/606 |
| 2020/0111295 A1* | 4/2020 | Glenn | .................... | G02B 5/021 |

FOREIGN PATENT DOCUMENTS

JP    2015-156317 A    8/2015

* cited by examiner

*Primary Examiner* — Keith G. Delahoussaye
(74) *Attorney, Agent, or Firm* — Metrolex IP Law Group, PLLC

(57) ABSTRACT

A long decorative illumination device according to one or more embodiments may include a plurality of light guide plates configured to reflect light entering therein from an end surface thereof with reflection surfaces formed in recesses thereon, and causing the light to be emitted from a light emitting surface thereof; a plurality of light sources provided corresponding to the plurality of light guide plates; and a long window part open from at least two directions of the front surface and side surfaces of the decorative illumination device; and the plurality of light guide plates is slanted with gaps therebetween, so that in the slanted state the light emitting surfaces thereof are oriented toward the window part.

16 Claims, 13 Drawing Sheets

Player Viewpoint

FIG. 10
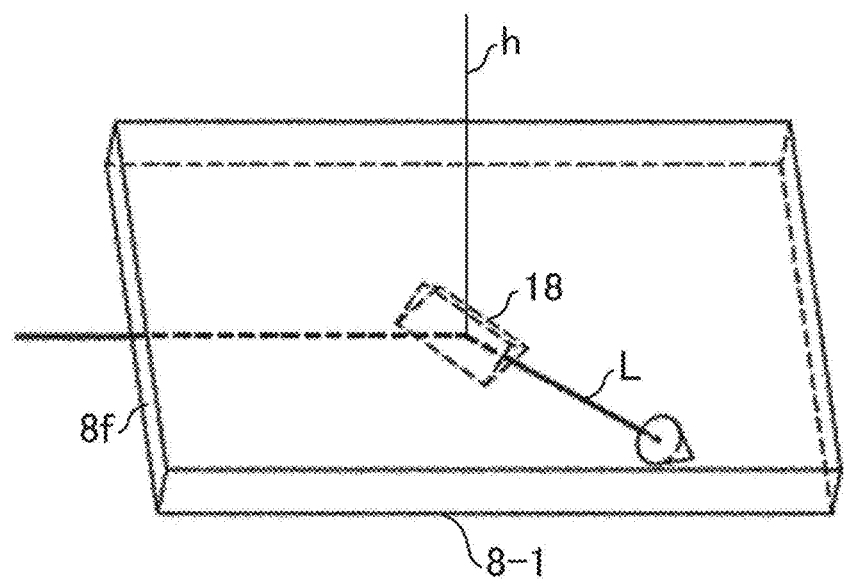
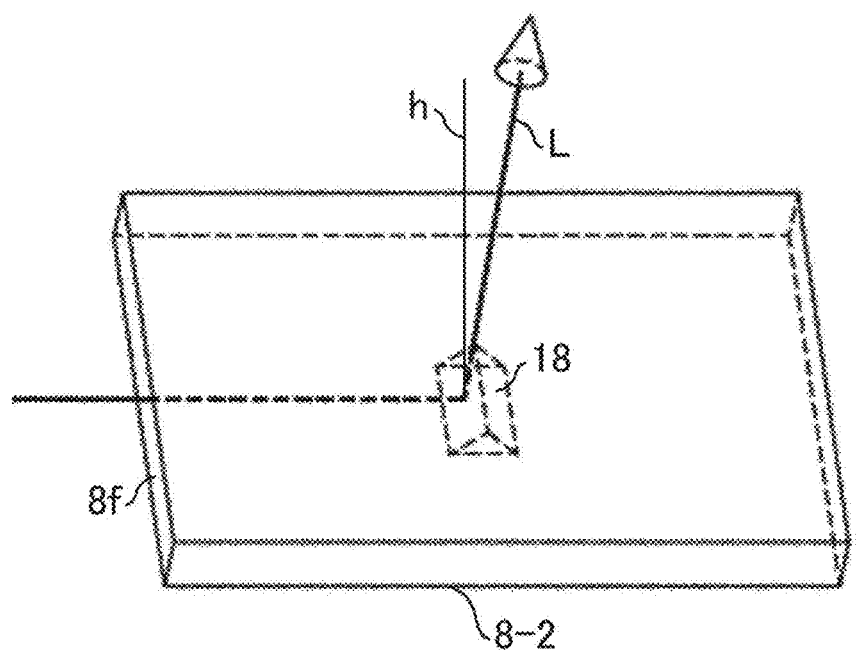

(Front)　　　(Side)　　　(Rear Diagonal)　　　(Rear)

DECORATIVE ILLUMINATION DEVICE AND GAME MACHINE

CROSS REFERENCE TO RELATED APPLICATIONS

This application claims priority to prior Japanese Patent Application No. 2020-037093 filed with the Japan Patent Office on Mar. 4, 2020, the entire contents of which are incorporated herein by reference.

FIELD

The disclosure relates to a decorative illumination device provided with a light guide plate and a game machine.

BACKGROUND

There is related technology for causing light emitted from a light source element to enter an end surface of a light guide plate, reflect from recesses provided in one surface (a reflection surface) of the light guide plate and be emitted from another (a light emitting surface). A decorative illumination device making use of such a technology may be loaded into a game machine, such as the slot machine or a gaming machine found at an amusement center, e.g., a casino, or the like. The present applicants have proposed a decorative illumination device that can be satisfactorily loaded into a game machine (e.g., Japanese Patent Publication No. 2015-156317).

A decorative illumination device according to one or more embodiments may be arranged with the light emitting surface oriented toward the front of the device; the decorative illumination device switches the illumination patterns in the light guide plate to provide optical presentation effects. Changing the combinations of the color of light emitted and the timing at which light is emitted thereby allows the decorative illumination device to create various illumination patterns.

Incidentally, the light emitting surface of the light guide plate in the above known decorative illumination device is oriented toward a player positioned in front of the game machine. Therefore, it becomes possible to present the player of the game machine a highly impactful visual effect. However, it is not possible to present a nearby user, who is not in front of the device, with such a highly impactful visual effect, and thus there is room for improvement.

A decorative illumination device according to one or more embodiments may be capable of presenting optical visual effects that are also highly impactful for a user positioned somewhere besides in front of the device, and to provide a game machine.

SUMMARY

A decorative illumination device according to one or more embodiments may be a long decorative illumination device including: a plurality of light guide plates configured to reflect light entering therein from an end surface thereof with reflection surfaces formed in recesses thereon, and causing the light to be emitted from a light emitting surface thereof; a plurality of light sources provided corresponding to the plurality of light guide plates; and a long window part open from at least two directions of the front surface and side surfaces of the decorative illumination device; and the plurality of light guide plates is slanted with gaps therebetween, so that in the slanted state the light emitting surfaces thereof are oriented toward the window part.

The plurality of light guide plates may be slanted with gaps therebetween, and the above configuration allows for the light emitting surfaces of the plurality of light guide plates to be oriented toward the window part while slanted. Arranging the plurality of light guide plates in the above described manner may allow for creates a sense of depth and allows for presenting not only the light emitting surface of the light guide plates but also the illumination of the outer edges of the light guide plate, as well as the shapes of the light guide plates.

The window part is open from at least two directions of the front surface and the side surfaces, whereby such a plurality of light guide plates whose light emitting surface and outer edges can be seen, is visible from the at least the two open directions. Hereby, it may be possible to present optical visual effects that are also highly impactful for a user who is somewhere other than in front of the device.

A decorative illumination device according to one or more embodiments may be configured to further include a mirror part that functions to reflect light, with the mirror part provided on an inner wall that divides the internal space where the plurality of light guide plates is arranged.

The above described configuration may allow the light emitted from the outer edges of the light guide plate located opposite the window part, and the light leaking out from the rear surface of the light guide plate, to be mirrored on and reflected by the mirror unit. Hereby, the light that originally could not be seen from the window part can be presented to the user, such as a player or the like, which may make it possible to increase the impact of the visual effect.

A decorative illumination device according to one or more embodiments may be configured so that the window part includes a half-mirror part that functions to reflect light and to transmit light.

A half-mirror part may be provided to the window part, and hereby the described above configuration may allow for presenting the window part as a mirror when any of the light guide plates are not illuminated. Additionally, the described above configuration may allow for only the light guide plate that is illuminated and surroundings brightened thereby to be seen when a portion of the plurality of light guide plates is illuminated; therefore, the above described configuration may create an optical illusion for the observer where the light guide plate appears as if it were floating in midair. When even more light guide plates are illuminated, brightening the internal space, and inside the device is visible by way of the window part, it may become possible to present all the visual effects from the plurality of light guide plates that are on the inside. Hereby, configuring the window part from a transparent window may further increase the impact of the visual effect.

A decorative illumination device according to one or more embodiments may be configured to further include a mirror part that functions to reflect light, with the mirror part provided on an inner wall that divides the internal space where the plurality of light guide plates is arranged; and may be configured so that the window part includes a half-mirror part that functions to reflect light and to transmit light.

In the above described configuration the mirror part provided on the inner wall, and the half-mirror part provided to the window part form opposite mirrors. In addition to the functional effects of the above-described mirror part and half-mirror part, the opposite mirrors may reflect the illuminated light guide plates numerous times to thereby may create a magical visual effect that has depth and may further increase the impact of the visual effect.

A decorative illumination device according to one or more embodiments may be elongated and long in the vertical direction; and configured so that the plurality of light guide plates is arranged in the vertical direction, in a slanted state in which the rear part thereof is higher than the front part thereof so that the light emitting surfaces are oriented toward the window part. The above described configuration may allow the decorative illumination device to be installed on the left and right sides of an enclosure for the main game unit.

A game machine according to one or more embodiments may include a main game unit and a decorative illumination device according to an aspect herein installed on the enclosure of the main game unit.

A decorative illumination device according to one or more embodiments may be capable of presenting optical visual effects that are also highly impactful for a user positioned somewhere besides in front of the device, and to provide a game machine.

BRIEF DESCRIPTION OF THE DRAWINGS

FIG. 10 is a diagram illustrating, conceptually, a difference in a recesses formed in a rear surface due to a difference in vertical position of a light guide plate;

DETAILED DESCRIPTION

One or more embodiments are described below on the basis of the drawings. One or more embodiments provide an example of a long decorative illumination device that may be assembled onto the enclosure of a game machine, where the decorative illumination device is vertically long.

1. Example Application

Figure 1:
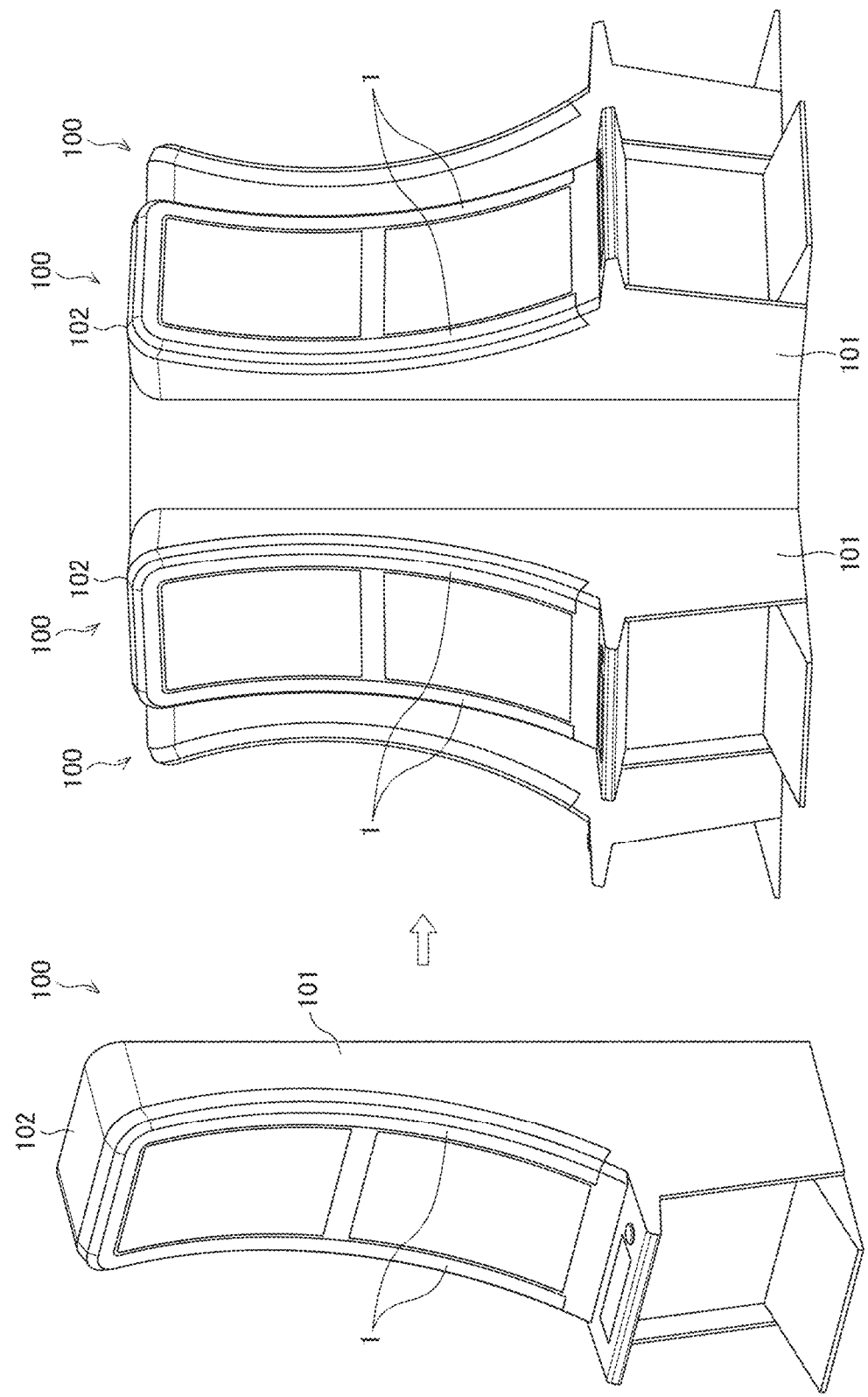
FIG. 1 is a perspective diagram illustrating an example of a game machine in which a decorative illumination device of a first embodiment is mounted.
Figure 2:
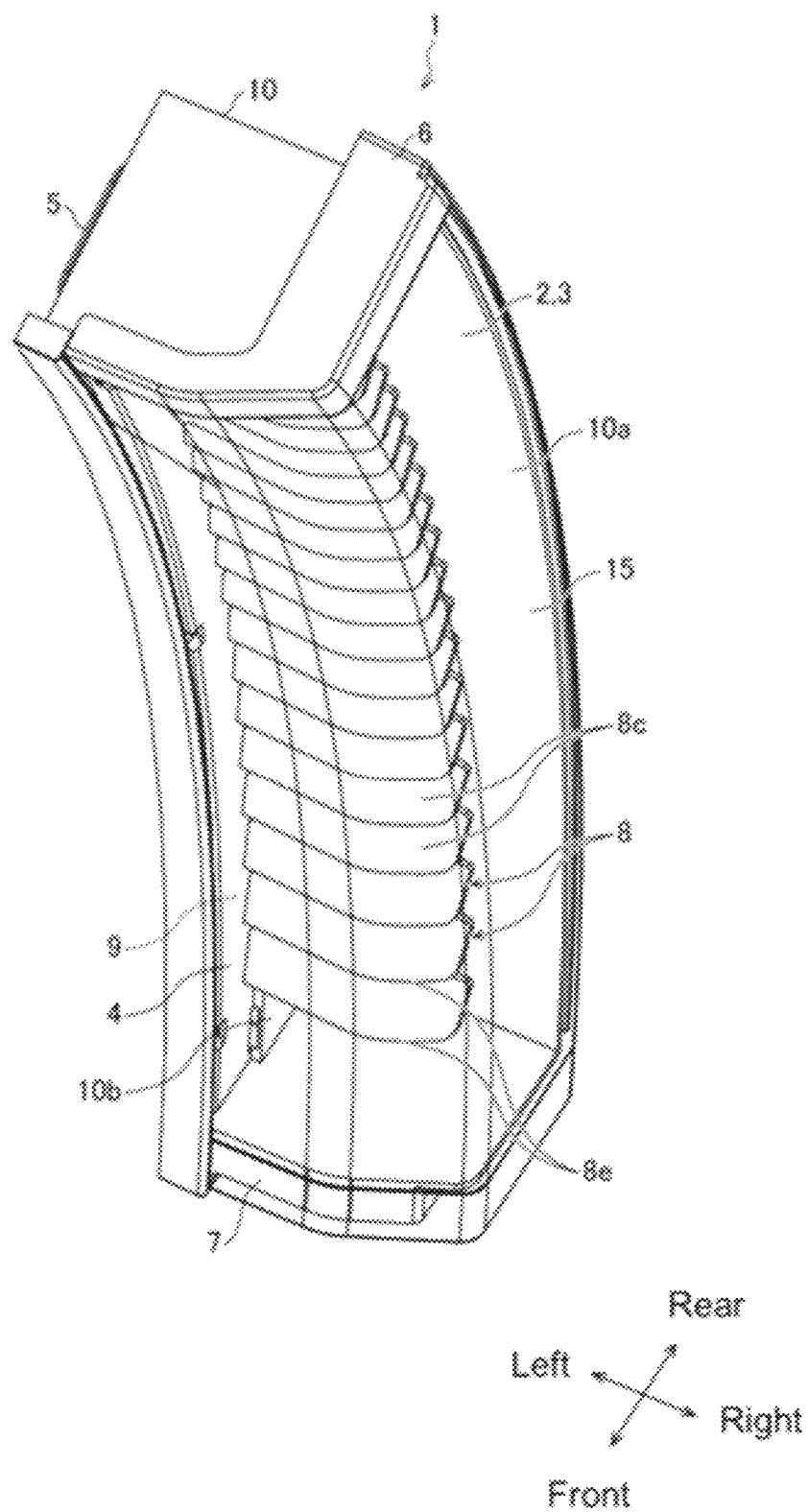
FIG. 2 is a perspective diagram illustrating a decorative illumination device when viewed from above while all light guide plates are illuminated.
Figure 3:
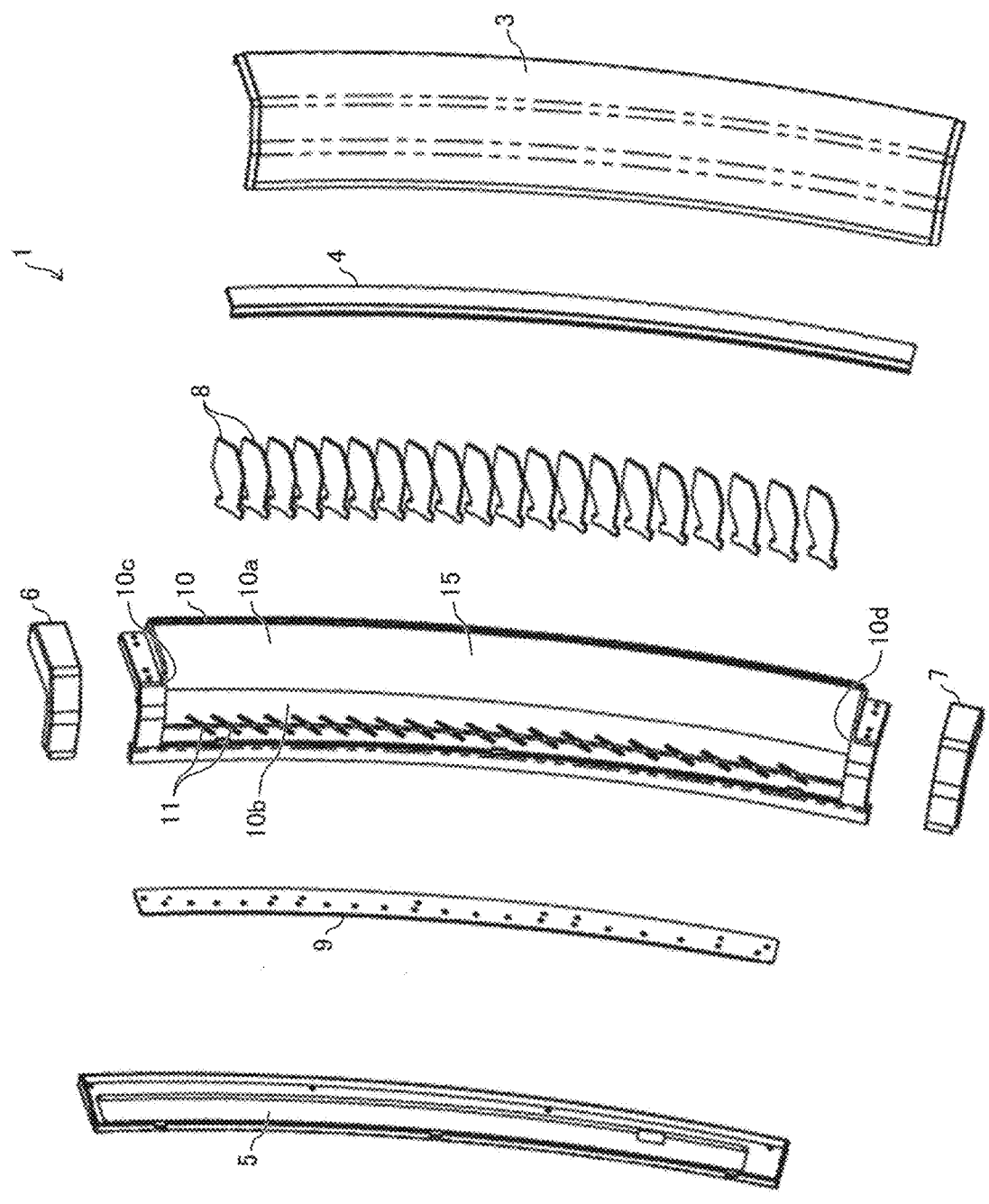
FIG. 3 is an exploded perspective diagram illustrating a configuration of a decorative illumination device.

As illustrated in FIG. 1, a decorative illumination device 1, which is vertically long, can be installed on the left and front right edges of the front surface of the enclosure 101 of a main game unit 102 in a game machine 100, such as a slot machine. As illustrated in FIG. 2 and FIG. 3, the decorative illumination device 1 is an elongated shape and is long in the vertical direction. The decorative illumination device 1 is equipped with a plurality of light guide plates 8, an LED substrate 9, and a long window part 2. The LED substrate 9 includes LEDs mounted thereon to serve as a plurality of light sources provided corresponding to the plurality of light guide plates 8. The window part 2 opens the decorative illumination device 1 from the front surface and the side surfaces which continues from the front surface, in at least two directions. A cover part 3, which is transparent or constituted by a half-mirror, is attached to the window part 2. The plurality of light guide plates 8 is arranged in the vertical direction with gaps therebetween and are in a slanted state in which the rear part higher than the front part so that the light emitting surfaces 8c are oriented toward the window part 2.

Figure 6:
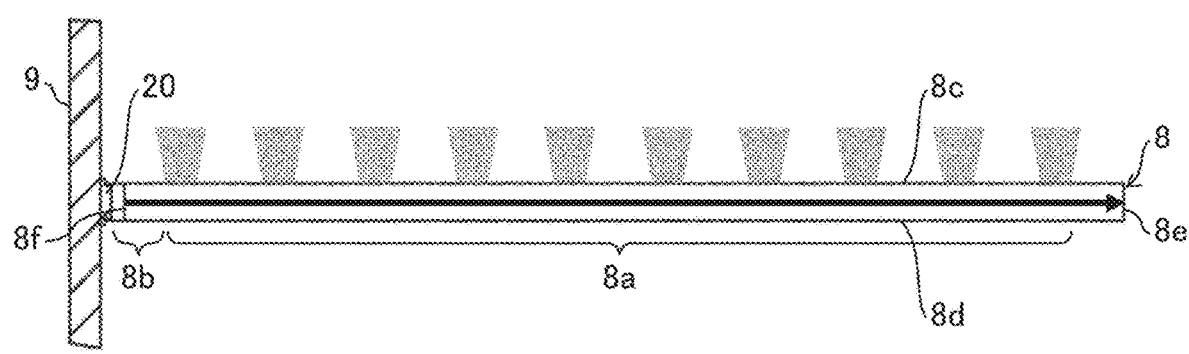
FIG. 6 is a diagram illustrating a cross-sectional view of a section in a horizontal direction, showing how light is guided in a decorative illumination device.
Figure 7:
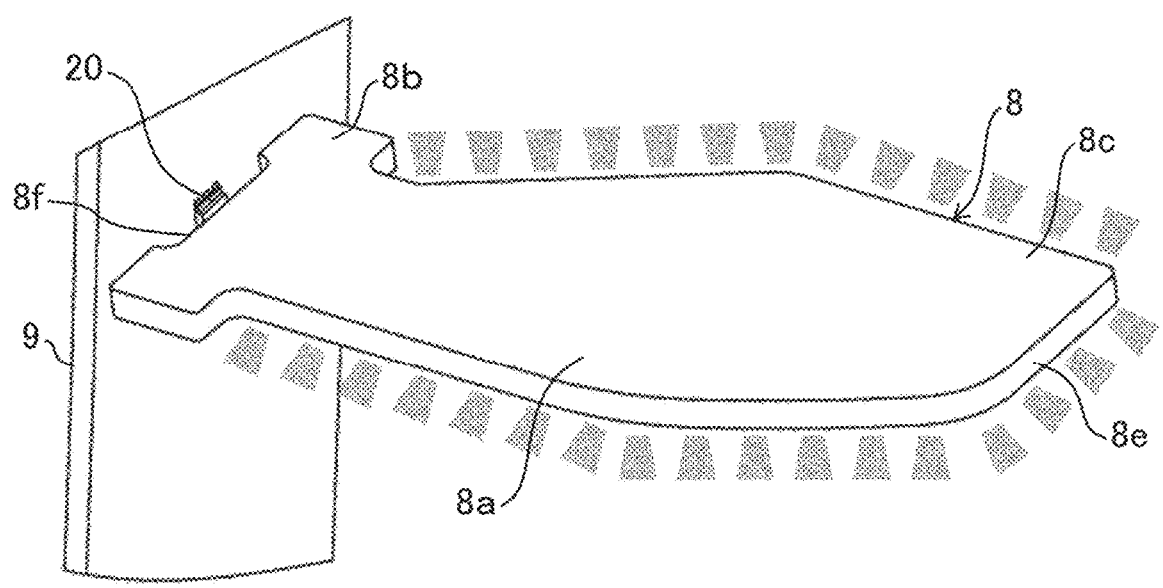
FIG. 7 is a perspective diagram illustrating a light guided in a decorative illumination device.

The window part 2, which is opened in at least the front and a side surface, allows the plurality of light guide plates 8 arranged along the vertical direction to be visible in the decorative illumination device 1. Accounting for the inclination of each of the light guide plates 8 in the arrangement allows not only the light emitting surface 8c but also the outer edges 8e thereof to be visible as illustrated in FIG. 6 and FIG. 7.

Figure 12:
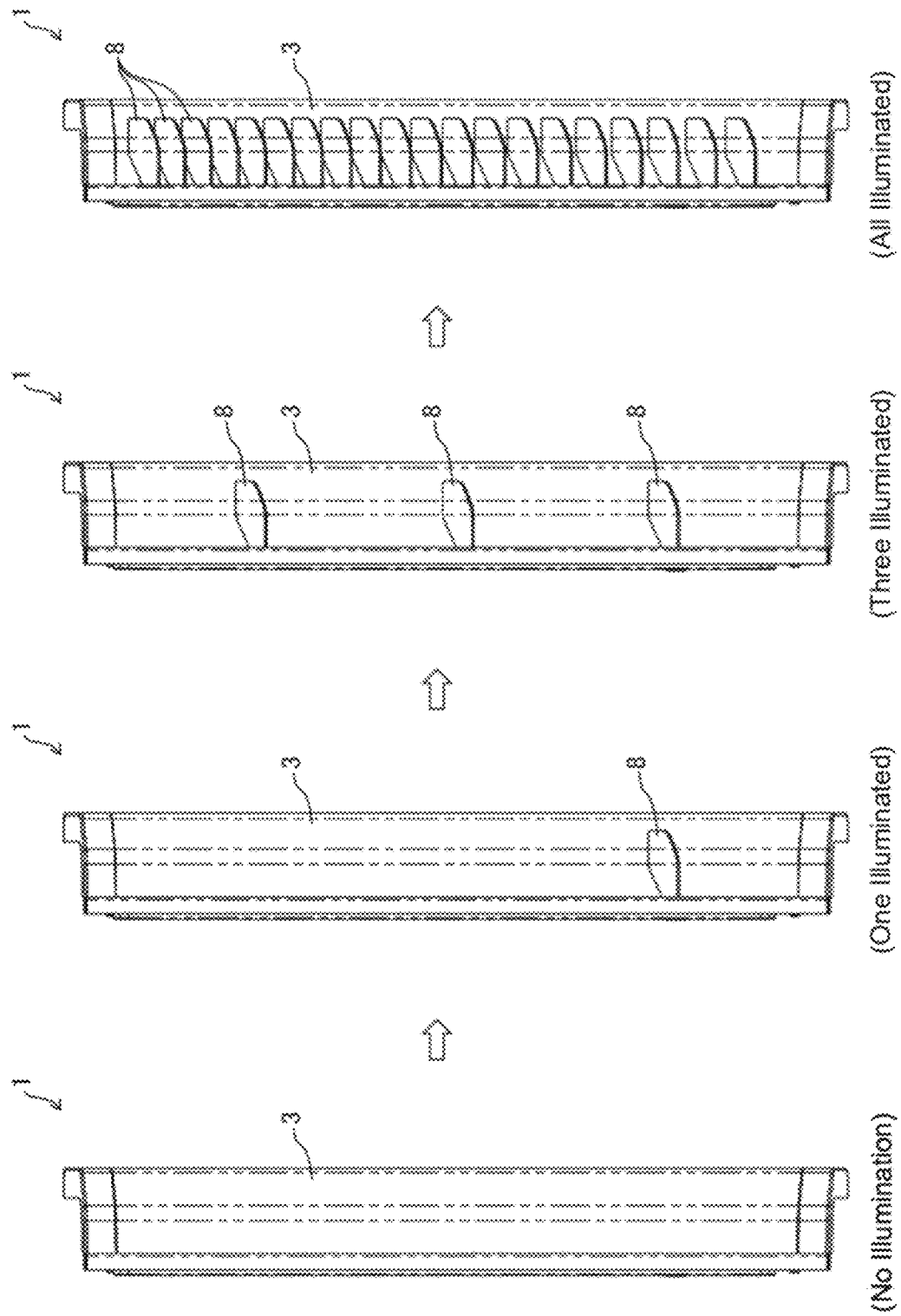
FIG. 12 is a diagram illustrating an example of a decorative illumination device presenting a visual effect.

As illustrated in FIG. 12, it is possible to illuminate any one light guide plate 8, any number of light guide plates 8, or all the light guide plates 8. The outer edges 8e of the light guide plates 8 may be illuminated whereby the respective contour lines appear as bright lines. The inner part of the contour lines allows each of the illuminated surfaces of the light emitting surfaces 8c to appear as bright surfaces because of planar illumination the entire surface or a graphic pattern due to the region in which the recess 18 is formed.

Thus, layering the light guide plates 8 vertically with gaps therebetween, allows a three-dimensional visual effect that is the combination of planar light from the plurality of light emitting surfaces 8c and linear light from the plurality of outer edges 8e; and allows the visual effect to be perceived from at least the front surface and side surface which are open via the window part 2. Consequently, a highly impactful visual effect can be presented to other users around a user who is positioned at the front of the game machine such as a player, or the like.

2. Example Configuration

First Embodiment

An embodiment herein is described below on the basis of FIG. 1 through FIG. 12. The described embodiment involves a decorative illumination device mounted in a game machine.

1. Game Machine Appearance

FIG. 1 is a perspective diagram illustrating an example of a game machine 100 in which a decorative illumination device 1 according to one or more embodiments is mounted. As illustrated in FIG. 1, the decorative illumination device 1 may be installed at the front left and front right edge sections of the enclosure 101 of the game machine 100. The front left and front right edge sections of the enclosure 101 are provided with recesses for inserting a decorative illumination device 1. In the description, provided herein, note that the horizontal direction refers to the left-to-right direction when facing the front of the game machine 100.

2. Overview of Decorative Illumination Device 1

FIG. 2 is a perspective diagram of the decorative illumination device 1 when viewed from above while all the light guide plates are illuminated. The decorative illumination device 1 in FIG. 2 is the decorative illumination device 1 attached to the right side edge section of (right side when facing) the game machine 100 in FIG. 1. The decorative illumination device 1 is elongated and is long in the vertical direction; for example, the decorative illumination device 1 may be a length of 120 cm. In the above described arrangement, the decorative illumination device 1 may include a curve at the rear part that creates a projection.

As illustrated in FIG. 2, the decorative illumination device 1 includes a window part 2 with front and right side surfaces that are exposed while the window part is inserted in the recess in the enclosure 101 of the game machine 100. The window part 2 is open from at least two directions of the front surface and the side surfaces continuing from the front surface of the device. The visual effect (visual effect lighting) due to light from the plurality of light guide plates 8 provided inside the decorative illumination device 1 can be seen via the window part 2. In the above described arrangement, the window part 2 is provided with a cover part 3 (half-mirror unit) that is made from a half-mirror. The cover part 3 is a single-sheet structure with no joint between the front surface and the right-side surface and the angled portion is chamfered.

A case 10, which is inserted into the recess in the enclosure 101, covers the back surface and left-side surface of the decorative illumination device 1. The plurality of light guide plates 8 is attached to the left-side wall 10b of the case 10. The plurality of light guide plates 8 is arranged in the vertical direction with gaps therebetween and are in a slanted state in which the rear part higher than the front part so that the light emitting surfaces 8c are oriented toward the window part 2. Arranging the plurality of light guide plates 8 to slant in the above described way thereby allows light emitted from light emitting surfaces 8c as well as light emitted from the outer edges 8e to be seen. An impactful visual effect that draws the interest of the player, users surrounding the device, and the like can be provided if two or more light guide plates 8 are used; however, the greater the number of light guide plates 8, the more dynamic the visual effect lighting that can be achieved.

A mirror unit 15 is provided on the inner surface of the rear wall 10a of the case 10. The rear wall 10a corresponds to an inner wall that divides the space inside which the plurality of light guide plates 8 are arranged. The mirror unit 15 and cover part 3 which is made of a half mirrors make up the later-described opposing mirrors. The components labeled with reference numerals 6, 7 in the drawing refer to end covers which are inserted in the upper end part and the lower end part of the decorative illumination device 1. Although not illustrated, the structure of the decorative illumination device 1 that is attached to the left-side edge section of the game machine 100 is bilaterally symmetrical to the structure of the decorative illumination device 1 in FIG. 2.

3. Configuration of the Decorative Illumination Device 1

Figure 4:
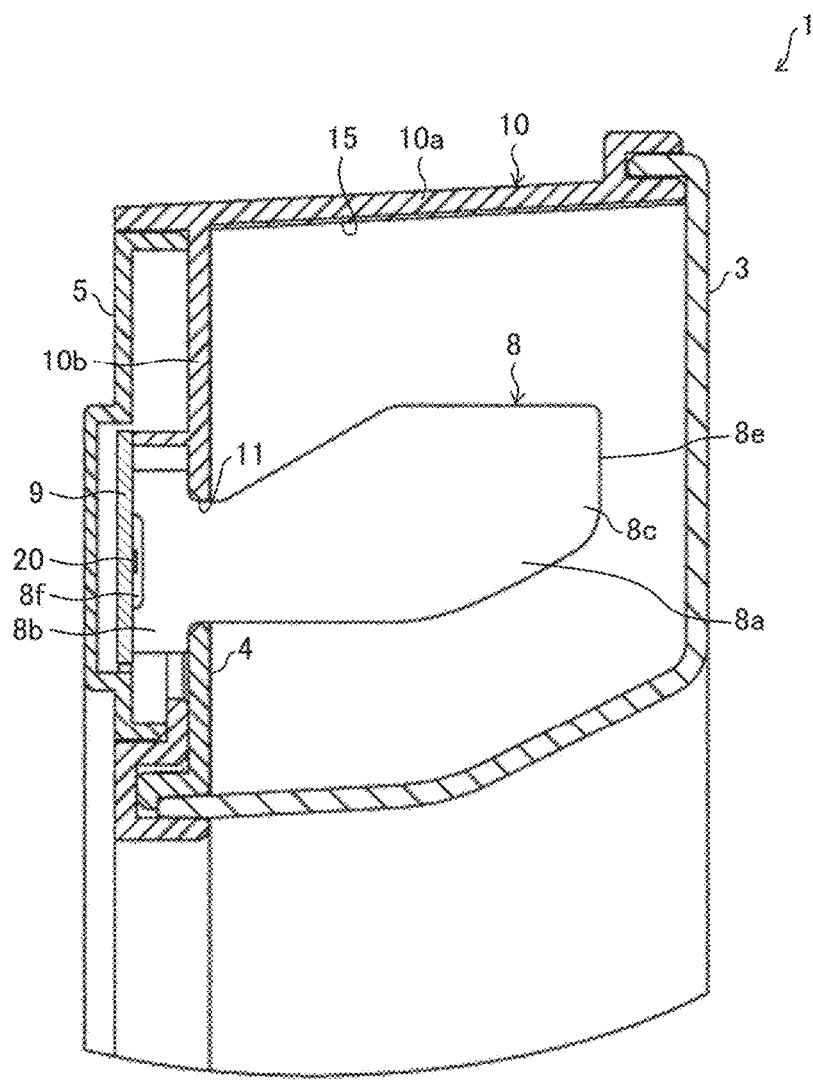
FIG. 4 is a diagram illustrating a cross-sectional view of a decorative illumination device sectioned parallel to a light emitting surface of a light guide plate.

FIG. 3 is an exploded perspective diagram illustrating a configuration of the above decorative illumination device 1; and FIG. 4 is a cross-sectional diagram of the above decorative illumination device 1 cut parallel to the light emitting surface 8c of a light guide plate 8. As illustrated in FIG. 3 and FIG. 4, other than the previously described cover part 3, case 10, plurality of light guide plates 8 and end covers 6 and 7, the decorative illumination device 1 may be provided with an LED substrate 9, a substrate cover 5 and an inner cover 4. The cover part 3, case 10, substrate cover 5, LED substrate 9, and inner cover 4 may be elongated to match the external shape of the decorative illumination device 1.

The case 10 supports the components making up the decorative illumination device 1, and the cross-section thereof, sectioned in the transverse direction in which the front side and right side are open, is L-shaped. The case 10 includes a rear wall 10a and a left-side wall 10b with upper wall 10c and lower wall 10d at the upper end and the lower end.

The left-side wall 10b has a plurality of fixing holes 11 formed along the vertical direction for supporting the light guide plate 8. The fixing holes 11 are inclined relative to the longitudinal direction (depth direction) with the front part low and the rear part high so that the light guide plates 8 are supported with the light emitting surfaces 8c sloped diagonally upward. The inclination angle of the fixing hole determines the inclination angle of the light guide plate 8 and the pitch of the fixing hole 11 determines the pitch of the gap between the light guide plates 8. The fixing holes 11 are through holes in the thickness direction of the left-side wall 10b, and the base part 8b of the light guide plate 8 (later described; see FIG. 5) is inserted into the fixing hole 11.

A plurality of LEDs 20 (light sources) for the plurality of light guide plates 8 are aligned in the vertical direction on the LED substrate 9. The LED substrate 9 is arranged at the rear side (outside) of the left-side wall 10b so that the LEDs 20 correspond to the locations of the plurality of fixing holes 11. Therefore, the LEDs 20 face the outer edge 8f of the base part 8b of the light guide plates 8 installed in the fixing holes 11. The substrate cover 5 is fitted to the rear side of the left-side wall 10b to cover the LED substrate 9.

As previously described, mirror unit 15 is provided on the inner surface of the rear wall 10a of the case 10. The mirror unit 15 functions to reflect light, and reflects an image that is a reverse of the image that can be seen from the plurality of light guide plates 8 via the window part 2.

The plurality of light guide plates 8 are made from a transparent polycarbonate or acrylic resin. The plurality of light guide plates 8 is installed respectively in the plurality of fixing holes 11 formed in the left-side wall 10b.

Figure 5:
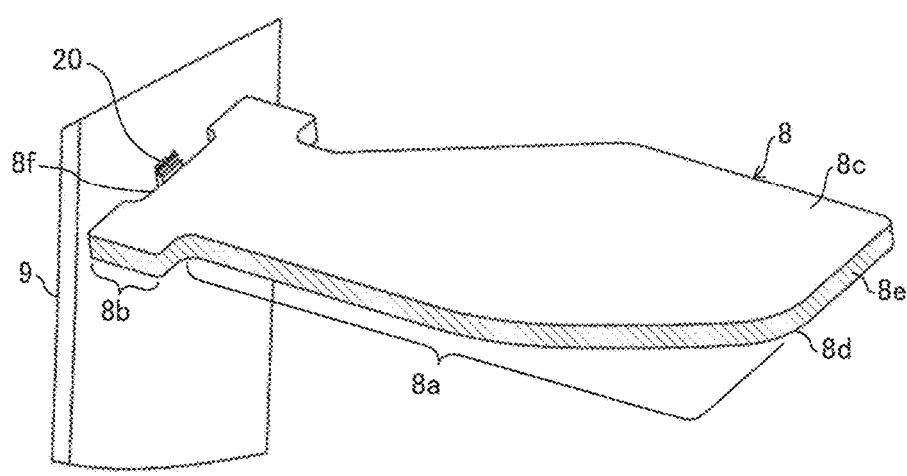
FIG. 5 is a perspective diagram illustrating a light guide plate and an LED substrate in a decorative illumination device.

FIG. 5 is a perspective diagram illustrating a light guide plate 8 and an LED substrate 9. As illustrated in FIG. 5, the light guide plate 8 includes a main part 8a of a desired shape and a base part 8b for attaching the light guide plate 8 to the left-side wall 10b; the main part 8a lights up when the LED 20 is turned on. The boundary section between base part 8b and the main part 8a is narrow. The outer edge 8f at the base part 8b facing the LED 20 is the light input surface. In the above described embodiment, the portion of the base part 8b facing the LED 20 includes a cavity that the LED 20 enters.

Recesses 18 (dimples) are formed on the rear surface 8d (reflection surface) that is opposite the light emitting surface 8c in the main part 8a (FIG. 10); the recesses 18 are for reflecting the light guided inside the main part 8a, causing the light to be emitted from the light emitting surface 8c. The light reflected by the recesses 18 are emitted from the light emitting surface 8c and thereby illuminate the light emitting surface 8c. The recesses 18 may be formed over the entire rear surface 8d of the main part 8a to obtain global illumination of the main part 8a, or may be formed on a portion of the rear surface 8d to create a design or pattern. Moreover, the light guided inside the light guide plate 8 may also be diffused and emitted from an outer edge 8e which is given an oblique line to also illuminate the outer edge 8e of the main part 8a.

Returning to FIG. 3 and FIG. 4, the inner cover 4 is at the front side of the surface inward of the left-side wall 10b. The inner cover 4 is fitted with the plurality of light guide plates 8 inserted into the plurality of fixing holes 11. The inner cover 4 covers the front side of the fixing holes 11, and thereby, the base part 8b of the light guide plates 8 is supported so that the base part 8b is held by the cavity behind the fixing hole 11 and the back end of the inner cover 4, thus securing the light guide plate 8 to the left-side wall 10b.

The cover part 3 is for covering the front surface and left surface which are open in the case 10; similarly to the case 10, the cross-section of the cover part 3 cut in the transverse direction is L-shaped, thus creating a corner shape. The cover part 3 is fitted to the case with the inner cover 4 attached to the case 10. The cover part 3 in the present embodiment, is constituted by a half-mirror as previously described. The half-mirror functions to reflect light and to transmit light.

4. Light Guiding in the Decorative Illumination Device 1

With reference to FIG. 6 and FIG. 7 light guided in the decorative illumination device 1 are described. FIG. 6 illustrates a cross-sectional diagram sectioned in the horizontal direction, and FIG. 7 is a perspective view. The light guide path for light from the LED 20 is depicted with a thick arrow in FIG. 6. Additionally, only the light guide plate 8 and the LED substrate 9 are depicted in FIG. 6 and FIG. 7.

As illustrated in FIG. 6, light emitted from the LED 20 enters the light guide plate from the outer edge 8f facing the LED 20. The light entering inside the light guide plate 8 is totally reflected between the light emitting surface 8c and the rear surface 8d while advancing therethrough. The light traveling through the light guide plate 8 and reflected by the recesses 18 formed on the rear surface 8d is emitted from the light emitting surface 8c and illuminates the light emitting surface 8c. Additionally, the light advancing through the light guide plate 8 and arriving at the outer edge 8e is diffused by the outer edge 8e and illuminates the outer edge 8e as illustrated in FIG. 7.

5. Shape of the Recesses in the Light Guide Plate 8

Figure 8:
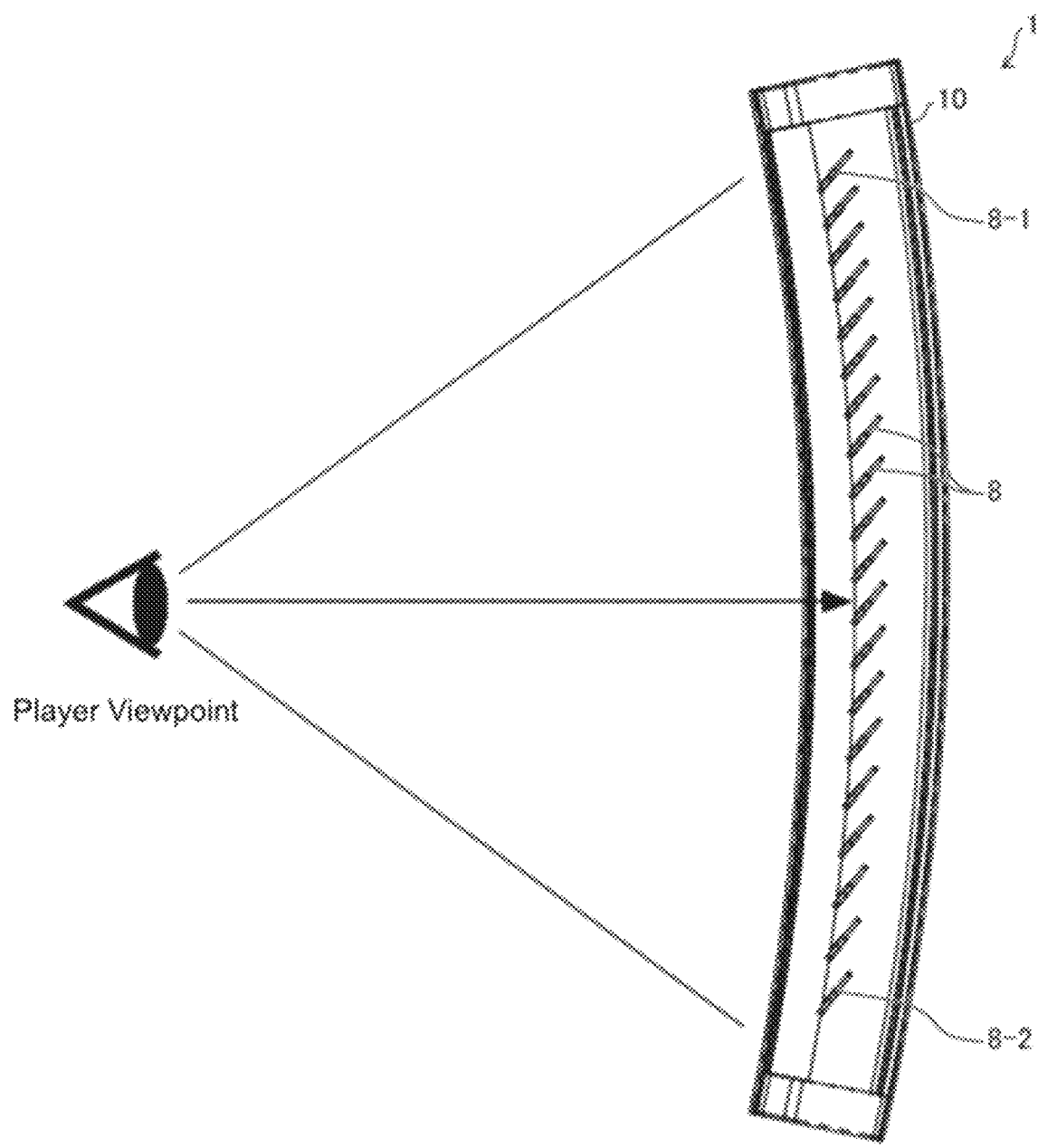
FIG. 8 is a diagram illustrating a relationship between a plurality of light guide plates in a decorative illumination device and a viewing position of a player.

FIG. 8 is a diagram illustrating the relationship between the plurality of light guide plates 8 in the decorative illumination device 1 and the viewing position of a player. As illustrated in FIG. 8, the light guide plates 8 and the viewing position of the player differs in the vertical direction because the plurality of light guide plates 8 is arranged along the vertical direction. The travel direction of the light emitted from each of the light emitting surfaces 8c of the light guide plates 8 is established so that the advancing direction is toward the viewing position of the player. The travel direction of the light emitted from a light emitting surface 8c is determined in accordance with the shape of the recesses 18 formed on the rear surface 8d. Because the viewing position of the player changes with the height of the player, the average height and the like is considered when determining the travel direction.

Figure 9:
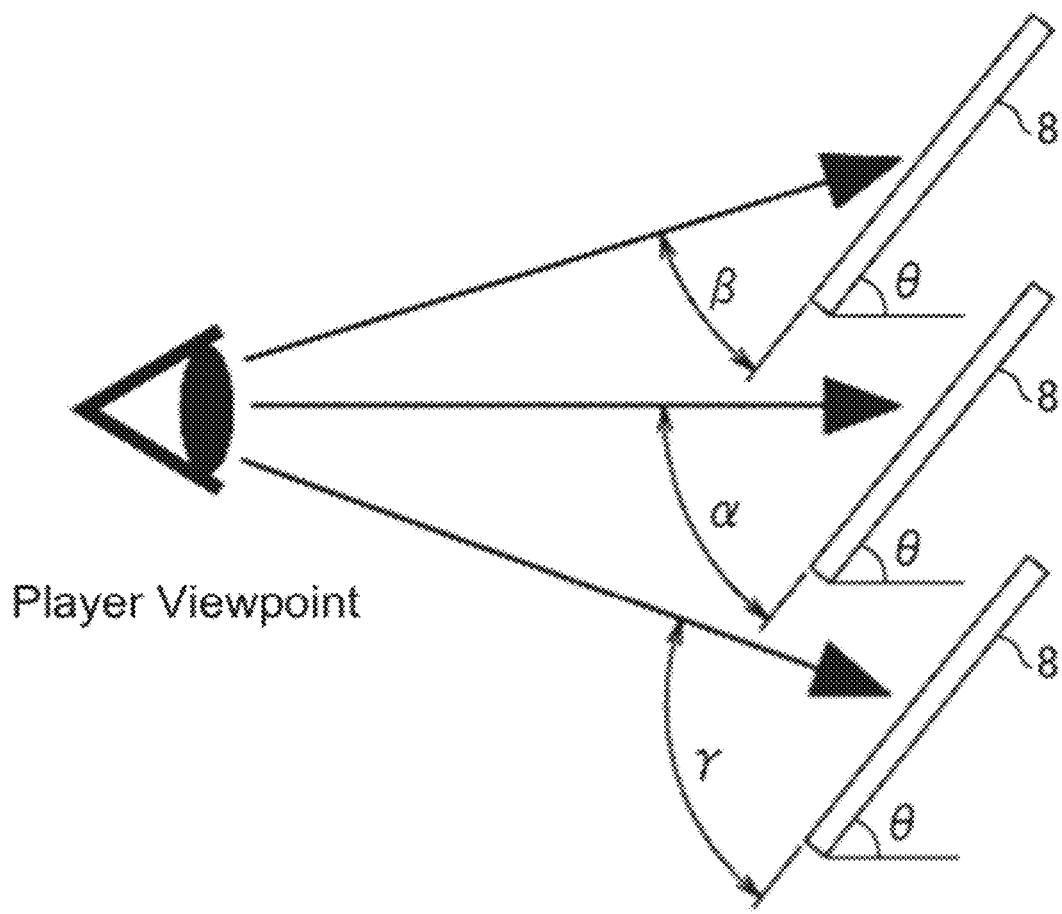
FIG. 9 is a diagram illustrating a difference in an angle formed between a light emitting surface and a player's line-of-sight due to a difference in a vertical position of a light guide plate.

With reference to FIG. 9 a difference in the angle formed between the light emitting surface 8c and the player's line-of-sight due to the difference in the vertical position of a light guide plate 8 is described. As illustrated in FIG. 9, when the angle of inclination relative to the longitudinal direction of the light guide plate 8 is θ, the angle created by the light emitting surface 8c and the player's line-of-sight is γ>α>β, and grows larger for the light guide plate 8 located toward the bottom and smaller for the light guide plates 8 located toward the top. The shape of the recesses may be designed with the above points in mind so that the light emitted from the light emitting surfaces 8c of the light guide plates 8 travel parallel to the player's line of sight to arrive at the player's viewpoint.

With reference to FIG. 10a concept of the difference in the recesses 18 formed in the rear surface 8d due to the difference in vertical position of the light guide plate 8 is described. The line segment h in FIG. 10 is normal to the light emitting surface 8c. The recesses 18 formed in the light guide plate 8-1 (see FIG. 8) at the highest location are formed to emit the light L entering from the outer edge 8f at shallow angle relative to the light emitting surface 8c. In other words, the recesses 18 formed in the light guide plate 8-1 emit the light L entering from the outer edge 8f at a steep angle relative to the line segment h.

Meanwhile, the recesses 18 formed in the light guide plate 8-2 (see FIG. 8) at the lowest location are formed to emit the light L entering from the outer edge 8f at steep angle relative to the light emitting surface 8c. In other words, the recesses 18 formed in the light guide plate 8-2 emit the light L entering from the outer edge 8f at a shallow angle relative to the line segment h.

6. Appearance of the Light Guide Plates 8 Illuminated in the Decorative Illumination Device 1

Figure 11:
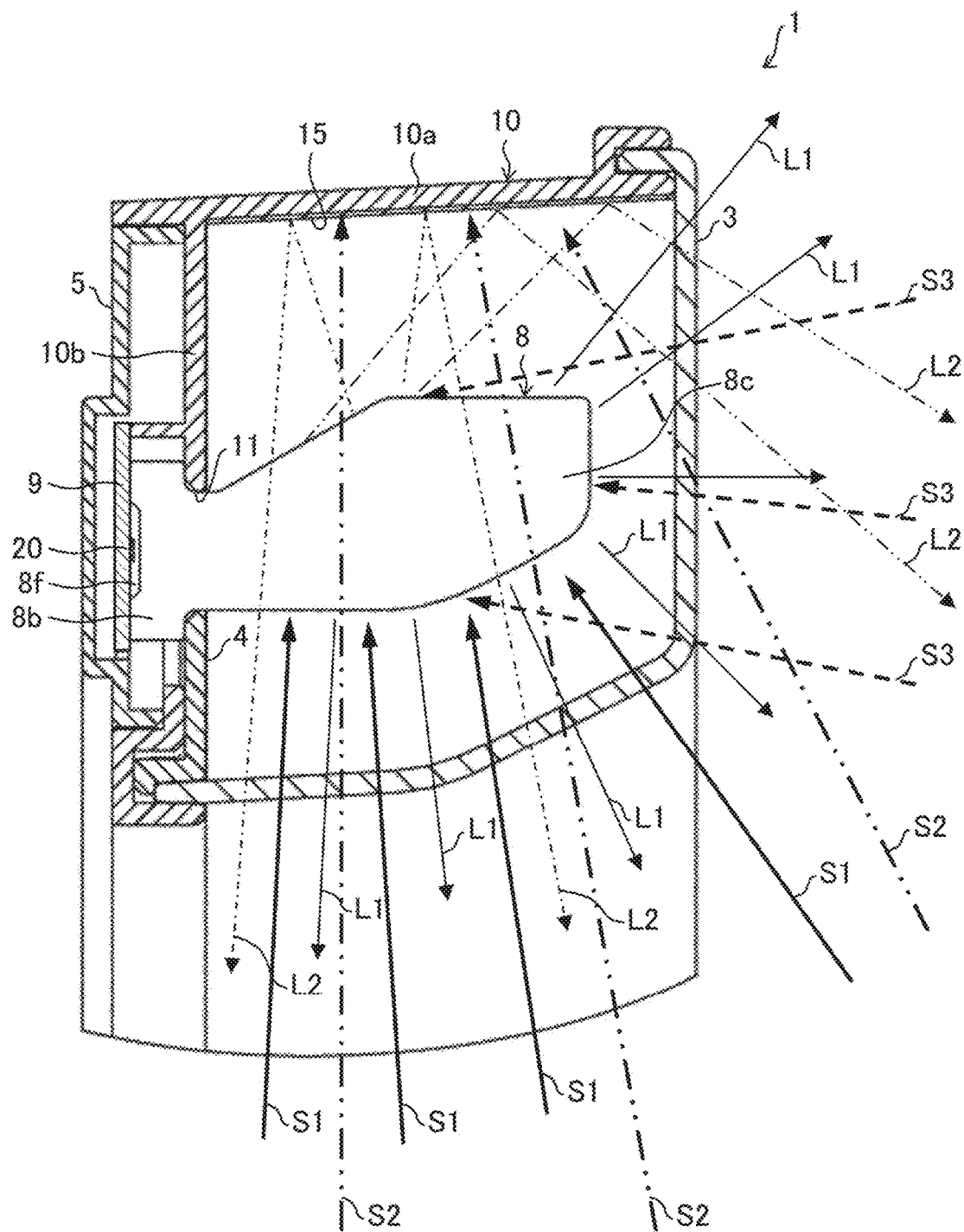
FIG. 11 is a diagram illustrating a concept of light emission from an illuminated light guide plate in a decorative illumination device and a concept of perception.

With reference to FIG. 11a concept of light emission from an illuminated light guide plate 8 in the decorative illumination device 1 and the concept of perception us described. FIG. 11 illustrates the same cross-sectional view as FIG. 4. It is possible to cause the plurality of light guide plates 8 to light individually and selectively, and various visual effects are possible by changing the color and timing of light emitted to change the light emission pattern.

When the LED 20 is turned on, light from the LED 20 enters the light guide plate 8 from the outer edge 8f and illuminates the light emitting surface 8c and the outer edge 8e of the light guide plate 8 (see FIG. 6 and FIG. 7). The illumination of the light guide plates 8 brightens inside the decorative illumination device 1, and the light inside passes through the cover part 3 which is constituted by a half-mirror, making it possible to see inside the decorative illumination device 1.

The light from the decorative illumination device 1 is the direct light L1 from the light guide plates 8, which is depicted by the thin solid arrows, and the reflection light L2 from the mirror unit 15, which is depicted by the thin dash double-dot lines. The direct light L1 includes the light traveling from the light emitting surface 8c of the light guide plate 8 in a direction established by the recesses 18, and the diffused light emitted from the outer edge 8e of the light guide plate 8 in various directions.

A user's line-of-sight may be the line-of-sight S1, which is depicted by a thick solid arrow, the line-of-sight S2, which is depicted by a thick dash double-dot arrow, and the line-of-sight S3, which is depicted by a thick dotted arrow.

The line-of-sight S1 is the line-of-sight along which a user such as a player or the like, positioned in front can see the light guide plates 8 directly. The line-of-sight S2 is the line-of-sight along which a user, e.g., a player positioned in front of the device, can see the light guide plates 8 reflected in the mirror unit 15. The line-of-sight S3 is the line-of-sight along which a surrounding user positioned at the side can see the light guide plates 8 from the side.

A user such as a player or the like, positioned in front of the device and a surrounding user positioned at the side can see the direct light L1 from the light guide plates 8 and the reflection light L2 reflected from the mirror unit 15. The shape of the recesses 18 are set so that the emission light from the light emitting surfaces 8c of the light guide plates 8 travel toward a player located in front; therefore, the direct light and the diffused light emitted from the outer edge 8e causes the player to see bright light. While a user in the surrounding area cannot see the light as brightly as the player, the user in the surrounding are does see a bright form that coincides with the contour shape of the light guide plates 8.

7. Example of Presenting Effects in the Decorative Illumination Device 1

With reference to FIG. 12 an example of the decorative illumination device presenting a visual effect is described. As illustrated in FIG. 12, the cover part 3 is mirrored, and made up of half-mirrors because the inside of the decorative illumination device 1 is dark when all the light guide plates 8 are not illuminated. Illuminating any given one of the light guide plates 8 brightens around the illuminated light guide plate 8; therefore, light permeates the cover part 3 at that portion allowing the illuminated light guide plate 8 to be seen. Because light permeates one portion of the mirrored cover part 3 and allows the light guide plate 8 inside to be seen, a magical visual effect may be achieved in which the light guide plate 8 appears as if it were floating in midair. Any number of light guide plates 8 among the plurality of light guide plates 8 may be illuminated to thereby create a visual effect in which a plurality of light guide plates 8 appear to be floating in midair. All the light guide plates 8 may be illuminated thereby allowing the light inside to pass through the cover part 3 and all the illuminated light guide plates 8 to be seen.

Additionally, the light guide plates 8 that are illuminated may change in order from top to bottom or from bottom to top to thereby perform a visual effect in which an object in the shape of the light guide plates 8 appears to move from top to bottom or from bottom to top. Additionally, the color emitted from all the light guide plates 8 may change as the light guide plates 8 are illuminated from top to bottom or from bottom to top to thereby perform a visual effect in which a band of light appears to move from top to bottom or from bottom to top.

8. Effect of the Decorative Illumination Device 1

Thus, the plurality of light guide plates 8 in the decorative illumination device 1 is arranged in the vertical direction with gaps therebetween and are slanted with the rear part higher up than the front part so that the light emitting surfaces 8c are oriented toward the window part 2. The window part 2 is open from at least two directions of the front surface and the side surfaces continuing from the front surface of the device.

Hereby, the window part 2, which is opened at the front and side surface, allows the plurality of light guide plates 8 arranged along the vertical direction to be visible. The light emitting surfaces 8c and the outer edges 8e of the light guide plates 8 can be made visible by accounting for the inclination of the light guide plates 8. The outer edges 8e may be illuminated whereby the respective contour lines appear as bright lines. The inner part of the contour lines allows each of the illuminated surfaces of the light emitting surfaces 8c to appear as bright surfaces because of planar illumination the entire surface or a graphic pattern due to the region in which the recess 18 is formed.

Thus, layering the light guide plates 8 vertically with gaps therebetween, allows for a three-dimensional visual effect that is the combination of planar light from the plurality of light emitting surfaces 8c and linear light from the plurality of outer edges 8e. Consequently, a highly impactful visual effect can be presented to other users around a user who is positioned at the front of the game machine such as a player, or the like.

The mirror unit 15 provided on the inner surface of the rear wall 10a also allows the image of the light guide plates 8 reflected on the mirror unit 15 to be perceived. That is, the light emitted from the outer edges 8e, which are located opposite the window part 2, and the light leaking out from the rear surface of the light guide plates 8, and the like are mirrored on and reflected by the mirror unit 15. Hereby, the light that originally could not be seen from the window part 2 can be presented to the user, making it possible to provide a more superior visual effect that is impactful.

Further, because the cover part 3 is constituted by a half-mirror, illuminating, for example, one light guide plate 8 or several light guide plates 8 among the plurality of light guide plates 8 with gaps therebetween, the observer may be presented with an optical illusion as if the light guide plate 8 were floating in midair, creating a magical visual effect.

Moreover, the combination of the mirror unit 15 and the half-mirror creates opposite mirrors, which creates more than the actual number of illuminated light guide plates 8 to be mirrored in the depth direction, and thus allows for creating an even more magical visual effect.

Second Embodiment

An embodiment herein is described below on the basis of FIG. 13 and FIG. 14. For the sake of convenience, components previously described in a first embodiment that have an identical function are given the same reference numerals, and explanations therefor are omitted.

Figure 13:
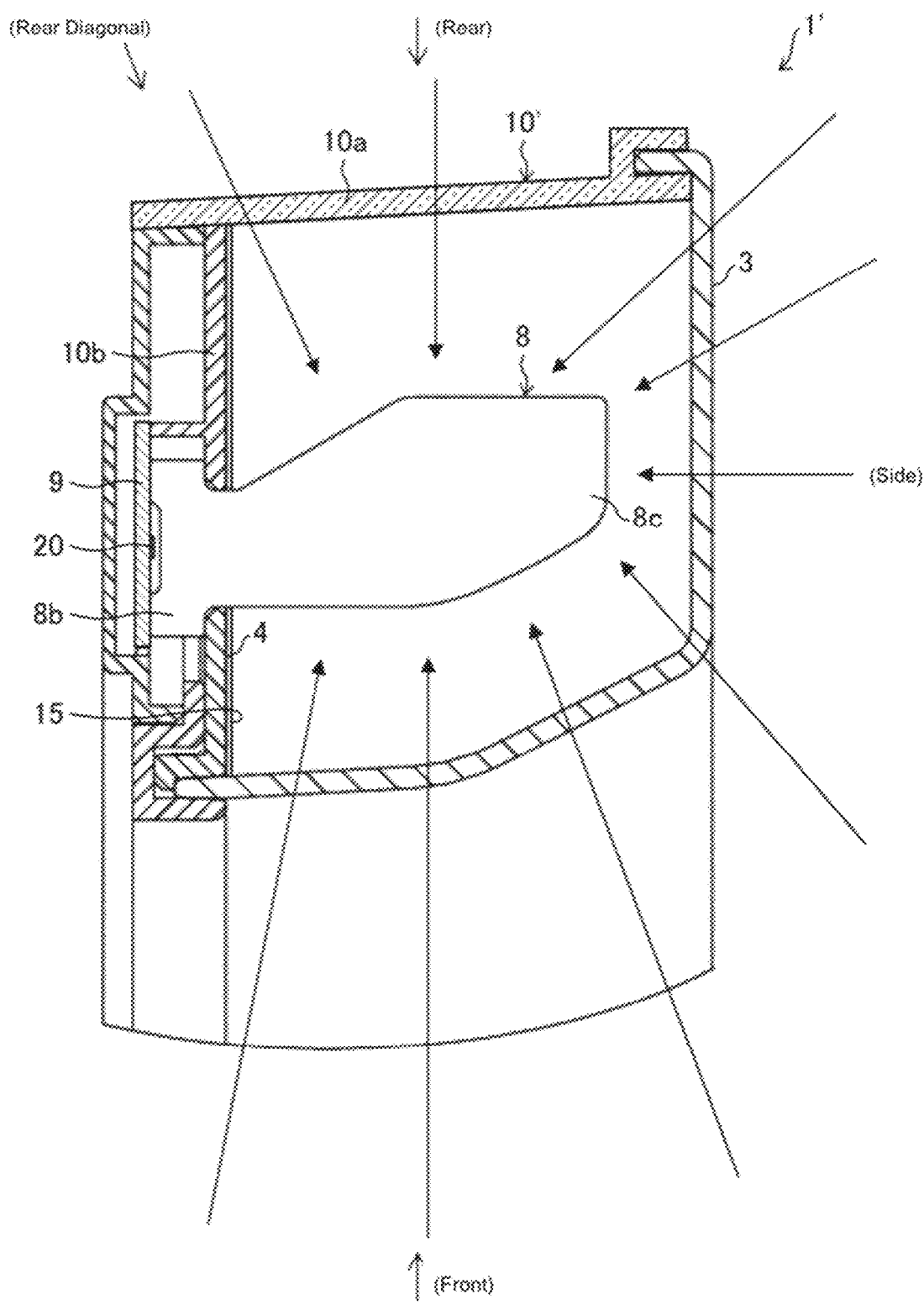
FIG. 13 is a diagram illustrating a cross-sectional view of a second embodiment of a decorative illumination device showing a section parallel to a light emitting surface of a light guide plate.

FIG. 13 is a cross-sectional diagram illustrating an embodiment of a decorative illumination device 1' sectioned parallel to the light emitting surface 8c of a light guide plate 8. The difference between the decorative illumination device 1' of the present embodiment and the decorative illumination device 1 of a first embodiment is the case 10'. As illustrated in FIG. 13, the rear wall 10a of the case 10' in the decorative illumination device 1' is made of a transparent material similar to the cover part 3. In above described embodiment, the rear wall 10a is constituted by a half-mirror similar to the cover part 3. The mirror unit 15 is provided on the inner wall constituted by the left-side wall 10b of the case 10' and the inner cover 4. The decorative illumination device 1' may be attached to the front left and right edge sections of an enclosure 101 for a game machine 100 while protruding laterally.

Figure 14:
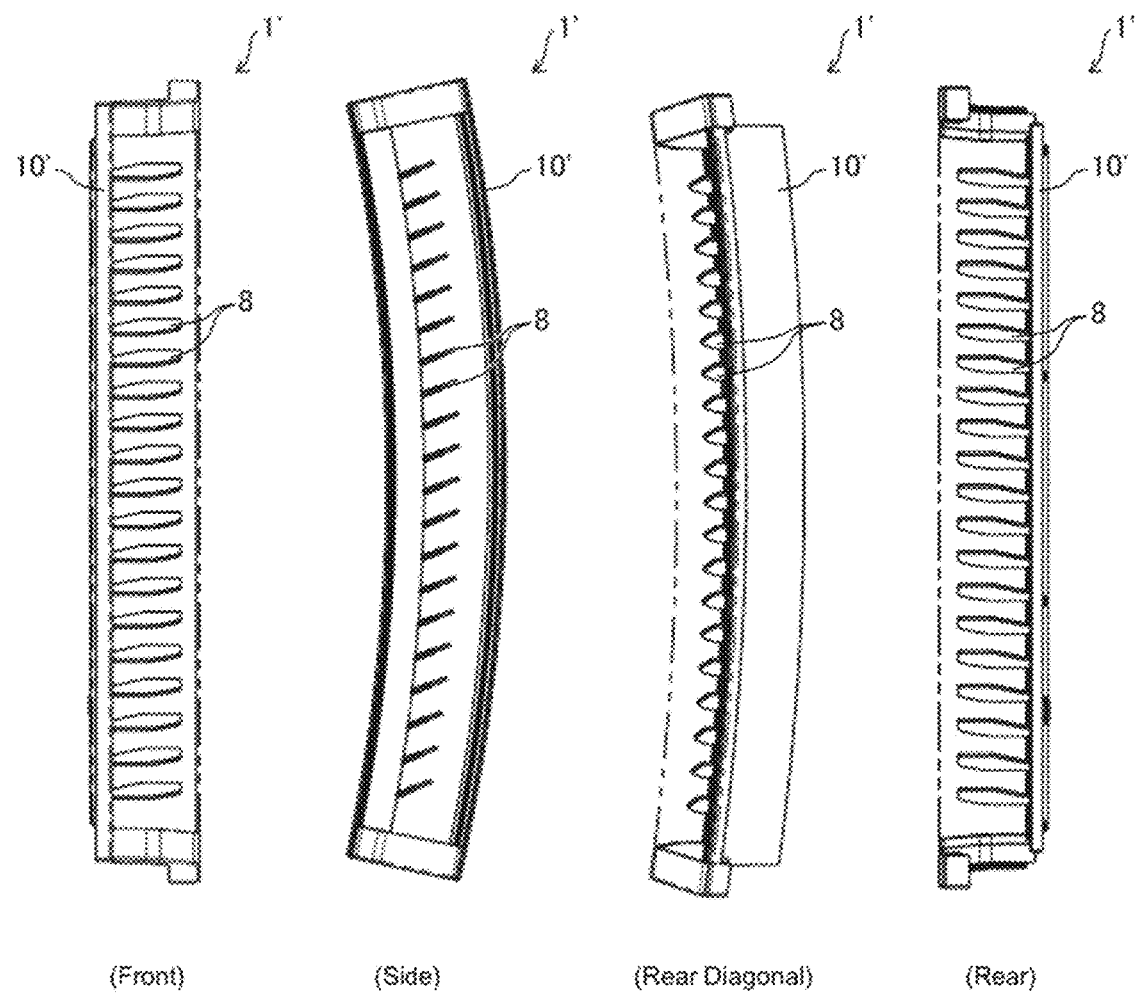
FIG. 14 is a diagram illustrating a decorative illumination device, for explaining how a decorative illumination device appears from a front, rear, side, and rear diagonal directions for a decorative illumination device, such as is illustrated in FIG. 13.

With reference to FIG. 14 the appearance of the decorative illumination device 1' from the front, rear, side, and rear diagonal directions is described. As illustrated in FIG. 14, the plurality of light guide plates 8 are visible from each of the front, rear, side (right side), and rear diagonal directions in the decorative illumination device 1'.

Thus, the light guide plates 8 inside the device may be seen from the front, rear, side (right side), and rear diagonal directions whereby a highly impactful visual effect may be presented for even a user located behind the game machine.

3. Modification Examples

While one or more embodiments are described above in detail, all points in the previous description are merely examples. It goes without saying that various modifications and variations are possible without departing from the scope of the invention. For instance, the following modifications are possible. Note that, for constituent elements that are identical to the constituent elements in the above described embodiment and that have the same reference numerals, a description of features that are identical to the above embodiment are omitted where appropriate for the sake of brevity. The following modifications may be combined as appropriate.

The above embodiments provide an example of a decorative illumination device that is long in the vertical direction as a long decorative illumination device that can be assembled onto the enclosure of a game machine. However, the decorative illumination device may be long in the horizontal direction, and the plurality of light guide plates 8 may be arranged along the horizontal direction.

Additionally, while in some embodiments the external shape of all of the plurality of light guide plates may be the same, light guide plates 8 with different external shapes may also be included. Light guide plates 8 may also be included that have shapes of the area of the recesses 18 formed, in which the recesses 18 determine the form of the illumination plane. Additionally, the inclination angle or gap between the light guide plates 8 need not be uniform. A mirror unit 15 may be provided on both the rear wall 10*a* and the left-side wall 10*b*. Moreover, a mirror unit 15 may also be provided on the upper wall 10*c* and the lower wall 10*d*. If the rear wall 10*a* is made up of the same transparent material as the cover part 3, the cross-section of the cover part 3 may be formed in a U-shape, the case may be formed as a long, narrow panel and the cover part and case may be fitted together.

The scope of the invention however is not limited to the above-described embodiments, and various modifications can be made within the scope of the claims, and one or more embodiments obtained by appropriately combining the technical means disclosed in the different embodiments are also included in the technical scope of the invention.

The invention claimed is:

1. A decorative illumination device comprising:
a plurality of light guide plates, each light guide plate of the plurality of light guide plates configured to reflect light entering from an end surface thereof with recesses formed on a reflection surface thereof, and causing the light to be emitted from a light emitting surface thereof;
a plurality of light sources corresponding to the plurality of light guide plates; and
a window part elongated in the vertical direction and open from at least two directions of a front surface and side surfaces of the decorative illumination device; wherein
the plurality of light guide plates is arranged longitudinally in the vertical direction, and being slanted with gaps therebetween, such that in the slanted state the light emitting surfaces thereof are oriented toward the window part.

2. The decorative illumination device according to claim 1, further comprising a mirror part that reflects light, the mirror part provided on an inner wall that divides an internal space where the plurality of light guide plates is arranged.

3. The decorative illumination device according to claim 1, wherein the window part comprises a half-mirror part that reflects light and transmits light.

4. The decorative illumination device according to claim 1, further comprising a mirror part that reflects light, wherein
the mirror part is provided on an inner wall that divides an internal space where the plurality of light guide plates is arranged; and
the window part comprises a half-mirror part that reflects light and transmits light.

5. The decorative illumination device according to claim 1, wherein
the decorative illumination device is elongated and long in a vertical direction; and
the plurality of light guide plates is arranged in the vertical direction, in a slanted state in which a rear part thereof is higher than a front part thereof such that the light emitting surfaces are oriented toward the window part.

6. The decorative illumination device according to claim 2, wherein
the decorative illumination device is elongated and long in the vertical direction; and
the plurality of light guide plates is arranged in the vertical direction, in a slanted state in which the rear part thereof is higher than the front part thereof such that the light emitting surfaces are oriented toward the window part.

7. The decorative illumination device according to claim 3, wherein
the decorative illumination device is elongated and long in the vertical direction; and
the plurality of light guide plates is arranged in the vertical direction, in a slanted state in which the rear part thereof is higher than the front part thereof such that the light emitting surfaces are oriented toward the window part.

8. The decorative illumination device according to claim 4, wherein
the decorative illumination device is elongated and long in the vertical direction; and
the plurality of light guide plates is arranged in the vertical direction, in a slanted state in which the rear part thereof is higher than the front part thereof such that the light emitting surfaces are oriented toward the window part.

9. A game machine comprising:
a main game unit; and
a decorative illumination device according to claim 1 installed on an enclosure of the main game unit.

10. A game machine comprising:
a main game unit; and
a decorative illumination device according to claim 2 installed on an enclosure of the main game unit.

11. A game machine comprising:
a main game unit; and
a decorative illumination device according to claim 3 installed on an enclosure of the main game unit.

12. A game machine comprising:
a main game unit; and
a decorative illumination device according to claim 4 installed on an enclosure of the main game unit.

13. A game machine comprising:
a main game unit; and a decorative illumination device according to claim 5 installed on an enclosure of the main game unit.

14. A game machine comprising:

a main game unit; and a decorative illumination device according to claim 6 installed on an enclosure of the main game unit.

15. A game machine comprising:

a main game unit; and a decorative illumination device according to claim 7 installed on an enclosure of the main game unit.

16. A game machine comprising:

a main game unit; and a decorative illumination device according to claim 8 installed on an enclosure of the main game unit.

* * * * *